United States Patent [19]
Lawrence, Jr.

[11] Patent Number: 5,458,040
[45] Date of Patent: Oct. 17, 1995

[54] TEACHING DEVICE FOR STRINGED INSTRUMENTS

[75] Inventor: James E. Lawrence, Jr., Massapequa, N.Y.

[73] Assignees: Gluckert; Gary, Islip Terrace; Lawrence; Scott, Worcester, both of N.Y.; a part interest

[21] Appl. No.: 200,347

[22] Filed: Feb. 23, 1994

[51] Int. Cl.⁶ .................................................. G09B 15/02
[52] U.S. Cl. .................................. 84/473; 84/485 R
[58] Field of Search ..................... 84/471 R, 473, 84/476, 480, 485 R

[56] References Cited

U.S. PATENT DOCUMENTS

| | | | |
|---|---|---|---|
| 2,001,191 | 7/1932 | Golden | 84/485 R |
| 3,153,970 | 10/1964 | Mulchi | 84/485 R |
| 3,379,088 | 8/1965 | Fox | 84/485 R |
| 3,554,074 | 1/1971 | Rickey | 84/485 R |
| 3,712,167 | 1/1973 | Renault | 84/485 |
| 3,736,833 | 6/1973 | Aluarado | 84/473 |
| 3,748,947 | 7/1993 | Freiheit | 84/485 R |
| 3,785,240 | 1/1974 | Hill | 84/485 R |
| 3,978,756 | 9/1976 | Feldman | 84/470 |
| 4,417,497 | 11/1983 | Nicklaus | 84/485 R |
| 4,622,880 | 11/1986 | Glemming et al. | 84/317 |
| 4,712,464 | 12/1987 | Nance | 84/485 R |
| 4,750,398 | 6/1988 | Rude et al. | 84/473 |
| 4,807,509 | 2/1989 | Graham | 84/314 R |
| 5,029,507 | 7/1991 | Bezeau, Jr. | 84/485 R |

*Primary Examiner*—Steven L. Stephan
*Assistant Examiner*—Patrick J. Stanzione
*Attorney, Agent, or Firm*—Collard & Roe

[57] ABSTRACT

A teaching device for stringed instruments is provided. The teaching device has an elongate board having grooved rails extending in spaced parallel relation along the longitudinal edges of the board for receiving templates. A template card depicting the string, note and fret configuration of the particular stringed instrument being used is first inserted into the grooves of the rails. A second transparent key template is inserted in the grooves over the first template card. The transparent key template has indicating indicia which indicates the proper notes to be played in the chosen key. The board is removably fastened to the neck of the stringed instrument.

6 Claims, 5 Drawing Sheets

TEACHING DEVICE FOR STRINGED INSTRUMENTS

BACKGROUND OF THE INVENTION

For the beginning student of a stringed instrument, finger placement can be quite complicated. In order to aid in finger placement, this invention relies on visual representation to help these beginning students. When the student can see the exact notes or chords played, he could then adjust his playing style accordingly. Since many of these students cannot differentiate between notes through hearing, the use of visual representation is very important.

1. Field of the Invention

The present invention relates to teaching devices for musical instruments. More particularly, it relates to a teaching device for stringed instruments.

2. The Prior Art

U.S. Pat. No. 3,978,756 to Feldman, discloses a Guitar Instruction System. The invention consists of a set of removable labels which are to be placed on the fingerboard of the guitar. These labels are deposed with the corresponding note indicia. In addition, a bracket for supporting sheet music or musical exercises is mounted to the neck of the guitar. A mirror, provided with the system, allows the user to look at both the sheet music and fretboard of the instrument without moving their head. Both the removable labels and the sheet music are written in reverse to facilitate using the mirror.

The patent to Hill, U.S. Pat. No. 3,785,240 discloses a Chord-Teaching Device for a Stringed Instrument. The invention consists of an elongated box with a plurality of vertical lines evenly spaced deposed on the front. Each vertical line represents a fret on the fretboard of a stringed instrument. A plurality of horizontal lines are deposed intersecting the vertical "fret" lines perpendicularly indicating the strings of the instrument, thus creating a representation of the fretboard of a stringed instrument. A plurality of holes are deposed on each of the horizontal (string) lines between each of the vertical fret lines. The user then inserts the chord card into the box. The chord card has an index for alignment with a fret row and a designation of fingers. Once inserted in the proper location, according to the alignment index, the fingering numbers and placement will be shown through the corresponding holes between the vertical (fret) and horizontal (string) lines.

The patent to R. L. Mulchi, U.S. Pat. No. 3,153,970, discloses an Aid For Stringed Instruments. The invention consists of a series of cards, each marked to indicate the correct finger positions for a certain chord. The card is placed between the strings and fretboard of the instrument and remains in position until the student situates their fingers according to the card, at which time the card is removed so that the chord can be played.

The Patent to Nance, U.S. Pat. NO. 4,712,464, discloses a Stringed Instrument Finger Positioning Guide. The invention consists of finger positioning guide for a flat surface positionable between the neck and strings of a stringed instrument. The guide is deposed with sets of uniformly colored spots. Each set of colored spots on the guide represent the fingering and strings for a particular chord. The guide also has an edge limiting device connected to the flat surface to facilitate the positioning of the guide and further to indicate the chords on the card. In another embodiment of the invention the edge limiting element may include a clamp shape for clamping the guide to the neck.

SUMMARY OF THE INVENTION

The invention discloses a teaching device for stringed instruments. This invention comprises an elongated board removably fastened to the fretboard of a stringed instrument and having grooved rails substantially parallel to each other and affixed along each spaced longitudinal edge of a surface of the board. The grooved rails receive a template card depicting the relevant fingerboard with the appropriate fret, string and note configuration thereon. A plurality of transparent key templates are provided representing the key in which teaching is desired. The transparent key templates have circles printed thereon to indicate the notes to be played in that key. Thus, when the transparent key template is inserted in the grooved rails and disposed above the previously inserted template card, the circles printed on the transparent key template will encircle, and thereby indicate, the proper notes to be played in the chosen key.

It is therefore an object of the present invention to provide a teaching device for stringed instruments that is simple to use and requires little or no supervision.

It is another object of the invention to provide a teaching device for all types of stringed instruments and is not limited to a specific type of stringed instrument.

It is yet another object of the invention to provide a teaching device for stringed instruments that indicates the particular note locations on the fretboard for any chosen key.

Another object of the invention is to provide a teaching device for stringed instruments that is inexpensive to manufacture and easy to apply to any stringed instrument.

BRIEF DESCRIPTION OF THE DRAWINGS

Other objects and features of the present invention will become apparent from the following detailed description considered in connection with the accompanying drawings which discloses two embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
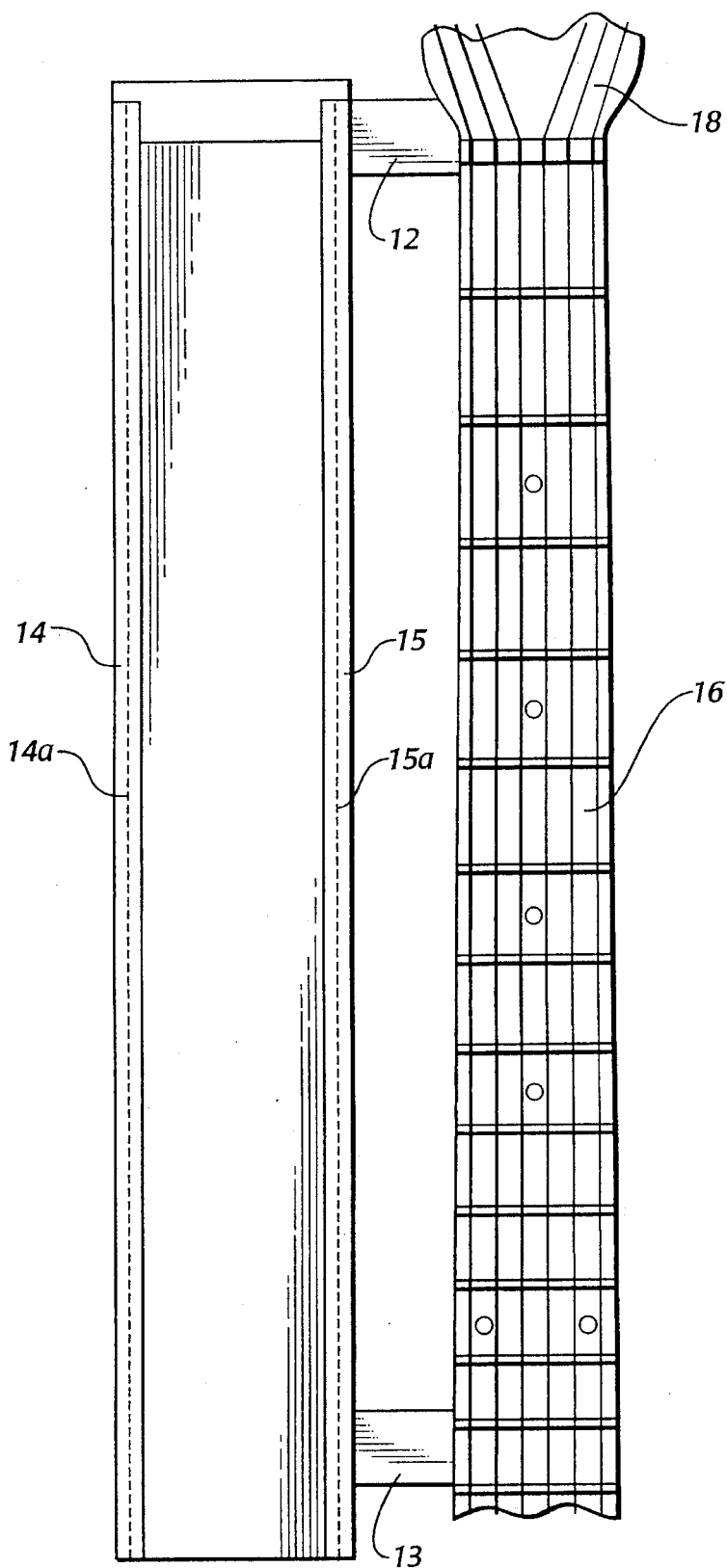
FIG. 1 is a perspective view of an embodiment of the teaching device of the present invention mounted on the fretboard of a stringed instrument.

Turning now in detail to the drawings, FIG. 1 shows a perspective view of the teaching device 10 of the invention mounted on the fretboard 16 of a six-stringed instrument 18. Teaching device 10 has two longitudinally extending grooved rails 14 and 15 extending along longitudinal edges. The rails and 15 have grooves 14a and 15a, respectively, formed therein in substantially parallel relation to each other. The grooved rails 14 and 15 are disposed along the upper edges of teaching device 10 in spaced parallel relation. Mounting brackets 12 and 13 removably fasten teaching device 10 to the stringed instrument 18. Mounting brackets 12 and 13 engage the rear side of fretboard 16 so as to not interfere with the playing of the stringed instrument 18.

Figure 2:
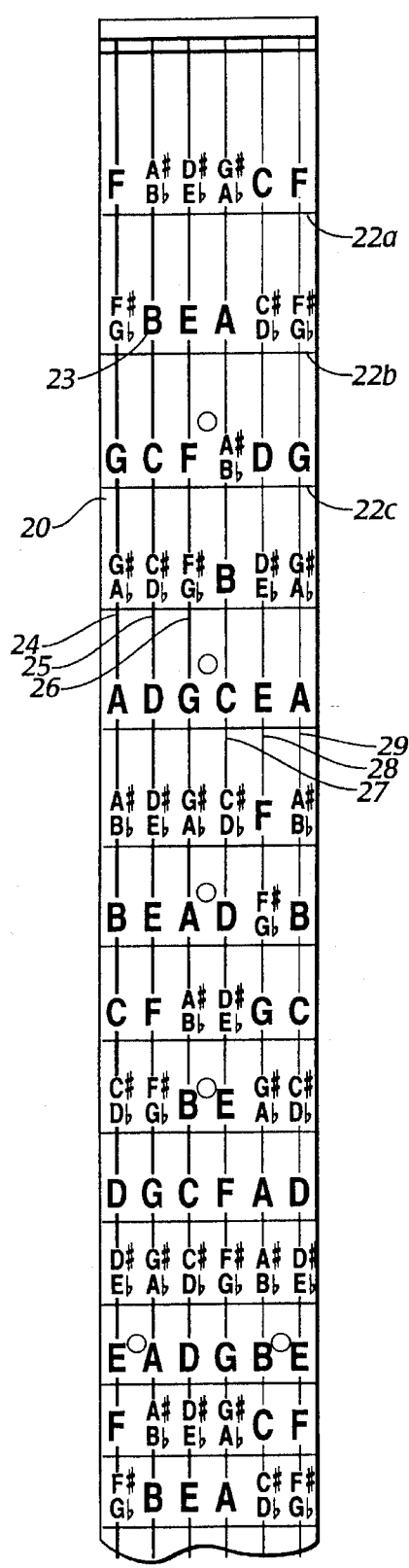
FIG. 2 is an front elevational view of a note template of the invention used for a six string instrument.

FIG. 2 shows a template card 20 for use with a six stringed instrument. Template card 20 displays each of the six strings 24, 25, 26, 27, 28 and 29 corresponding to the instrument along with the fret positions 22a, 22b, 22c, etc., also corresponding to the instrument. Note markings 23 depict what note is played when the string is pressed in that position.

Figure 3:
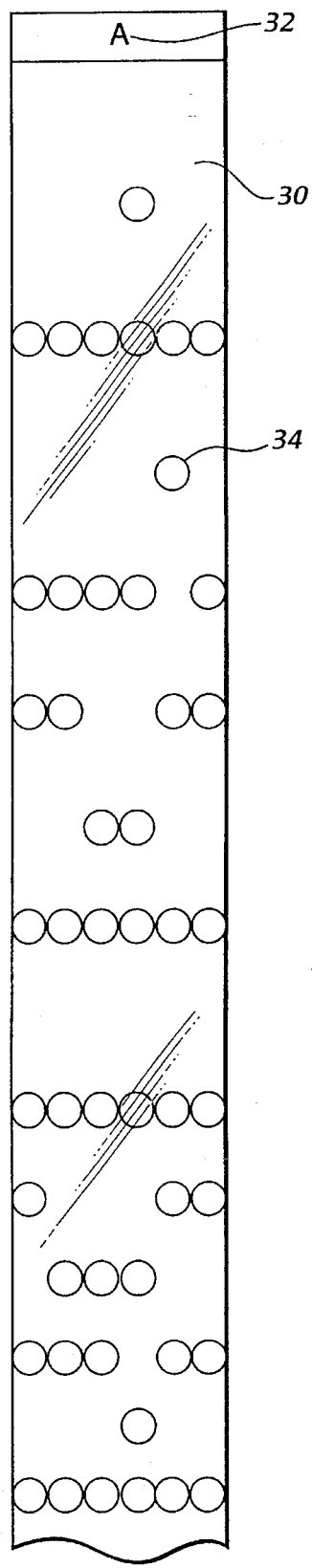
FIG. 3 and FIG. 4 are front elevational views of transparent key templates of the invention for the keys of "A" and "E"
Figure 4:
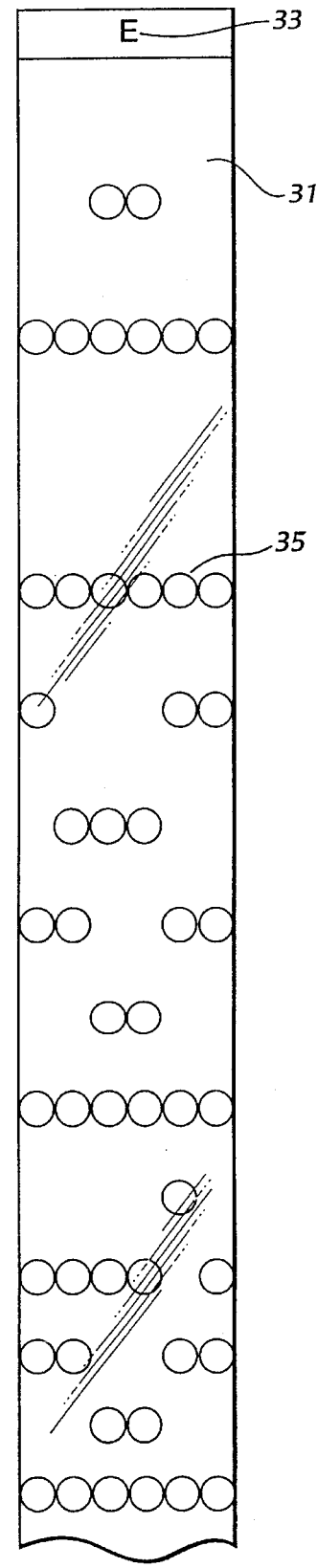

FIGS. 3 and 4 show transparent key templates 30 and 1, respectively. The key templates 30 and 31 are inserted into the grooved rails of teaching device 10 after template card 20 is in place. Key template 30 has a key indication 32 showing that this template is used to teach the key of "A". Note indicators 34 are specifically disposed over the entire length of the key template 30 so as to encircle the proper notes on template card 20 to be played in the key of "A." Key template 31 has a key indication 33 showing that this template is used to teach the key of "E." Note indicators 35 are specifically disposed over the entire length of the key template 31 so as to encircle the proper notes on template card 20 to be played in the key of "E."

Figure 5:
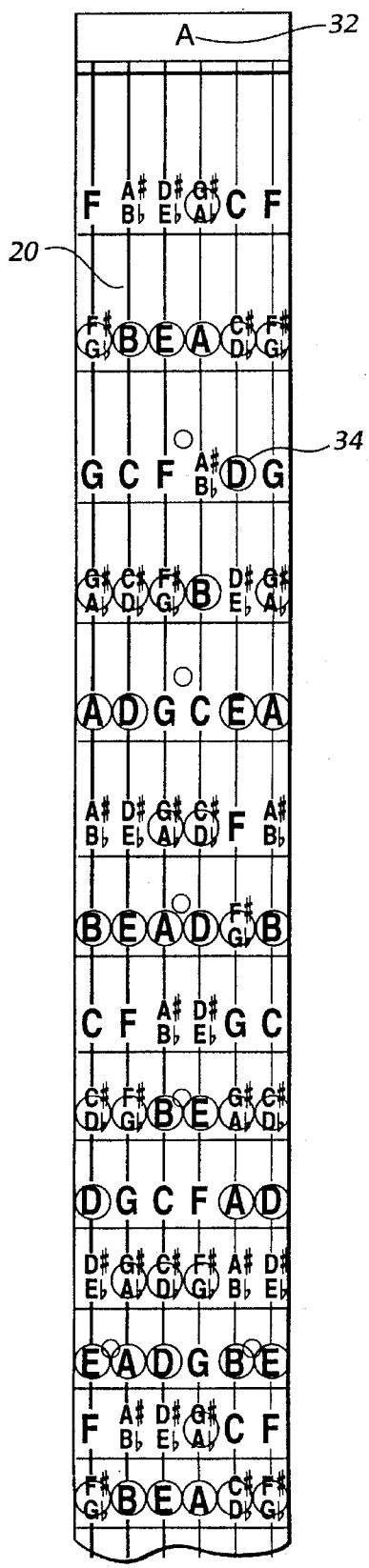
FIG. 5 is a front elevational view of a template card and transparent key template of the invention mounted on the teaching device of the invention.

FIG. 5 shows transparent key template 30 disposed over template card 20. Note indicators 34 are shown encircling the notes to be played in the key of "A," as indicated by key indicator 32.

Figure 6:
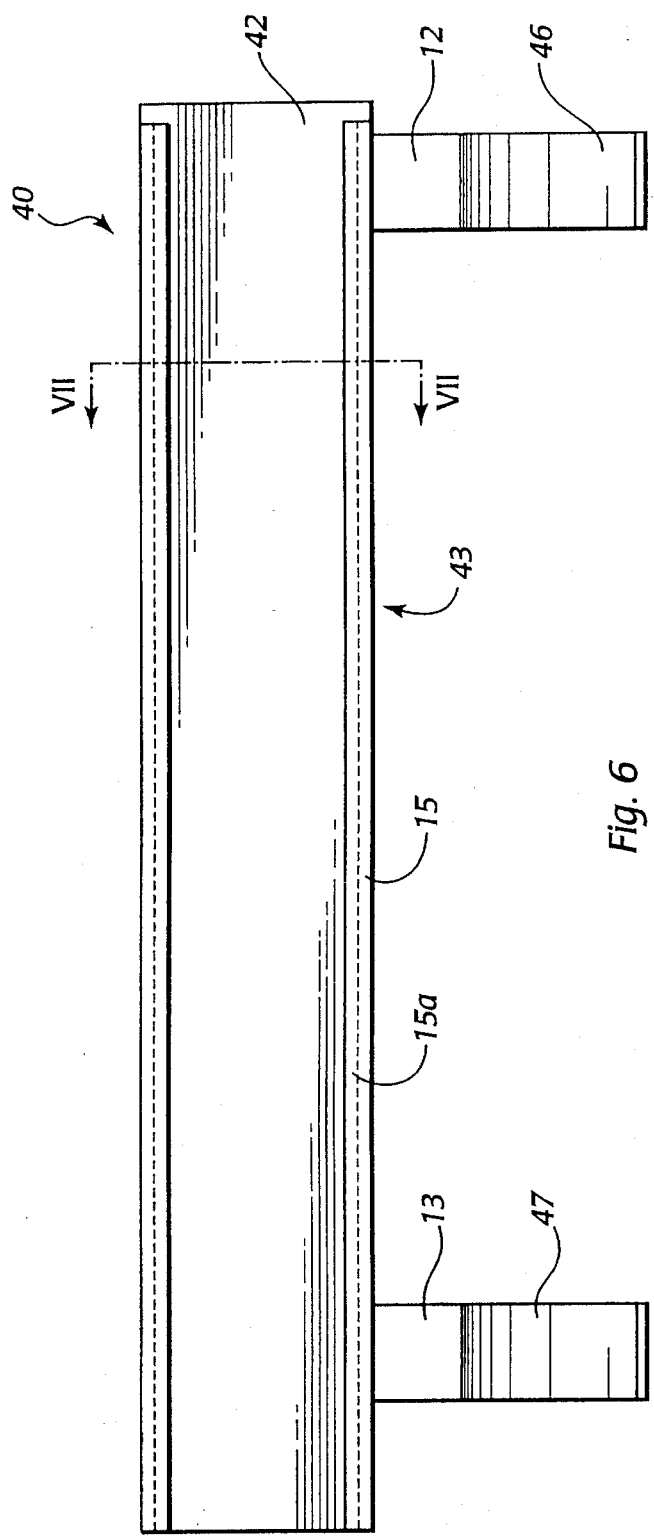
FIG. 6 is an elevational view of the embodiment of FIG. 1 of the teaching device of the invention.

FIG. 6 shows the teaching device 40 of the present invention. Grooved edge rails 14 and 15 are shown disposed in spaced, substantially parallel relation with respect to each other. Rail 14 having groove 14a is disposed longitudinally along edge 41 of board 42. Rail 15 having groove 15a is disposed longitudinally along the spaced opposite edge 43 of board 42 of teaching device 40. Mounting brackets 12 and 13 are provided for removably fastening teaching device 40 to the fretboard of a stringed instrument. Mounting brackets 12 and 13 may be fastened to the stringed instrument using hook and loop type fasteners, or, in another embodiment using a pressure clamp. Grooved edge rails 14 and 15 are permanently fastened to the board 42 of teaching device 40 by any suitable known means.

Figure 7:
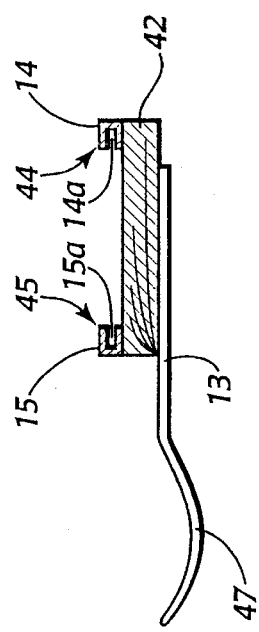
FIG. 7 is a cross-sectional view of the teaching device of the invention, taken along the line VII—VII, of FIG. 6.

FIG. 7 shows a cross section of the teaching device 40 having the board 42 and grooved edge rails 14 and 15 fastened thereto. Grooved edge rails 14 and 15 have grooves 14a and 15a formed in their inner edges 44 and 45, respectively. The grooves 14a and 15a, respectively, accomodate both a template card and a transparent key template. Mounting brackets 12 and 13 have curved ends 46 and 47, respectively, to enable said mounting brackets to fit snug on the stringed instrument, so as to not interfere with the playing of the stringed instrument.

Figure 8:
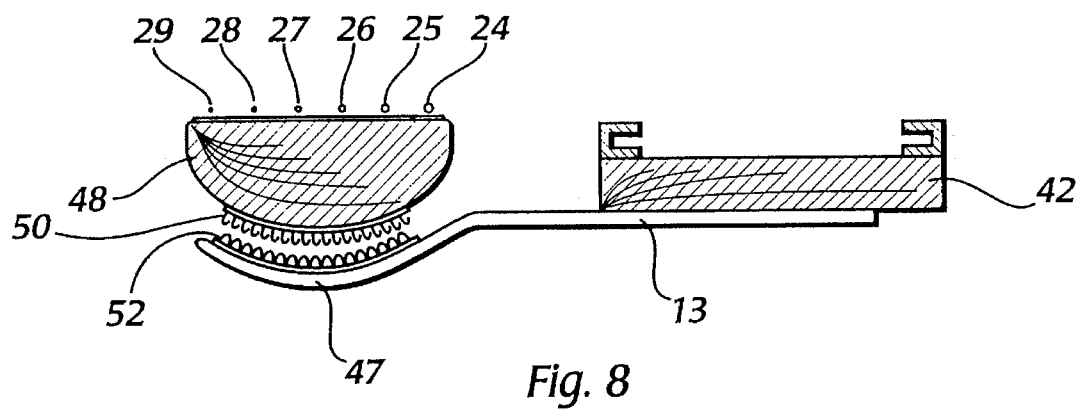
FIG. 8 is a sectional view of one of the mounting means of the teaching device of the invention.

Mounting brackets 12 and 13 can be removably fastened to a stringed instrument by using a hook and loop type fastener (FIG. 8). Curved ends 46 and 47 of mounting brackets 12 and 13, respectively, have loops 52 fastened thereto. Stringed instrument 48 has hooks 50 affixed thereon to engage the loops 52 on curved ends 46 and 47.

Figure 9:
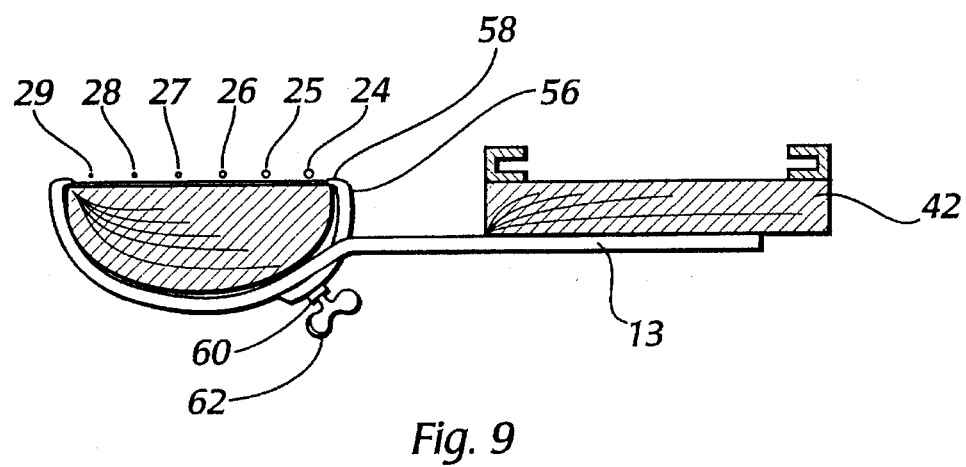
FIG. 9 is a sectional view of another of the mounting means for the teaching device of the invention.

FIG. 9 shows curved end 47 of mounting bracket 13 with a pressure clamp 56 for removably fastening board 42 to a stringed instrument 48. Curved end 47 terminates as a claw 54 so as to engage and hold stringed instrument 48 in place when pressure clamp 56 is tightened. Pressure clamp 56 has a claw end 58 for engaging and securing stringed instrument 48 in place. Pressure clamp 56 is adjustable to accommodate different size stringed instruments. Securing nut 62 tightens pressure clamp 56 to fasten board 42 to stringed instrument 48. A lock washer 60 prevents pressure clamp 56 from unintentionally coming loose.

While several embodiments of the present invention have been shown and described, it is to be understood that many changes and modifications may be made thereunto without departing from the spirit and scope of the invention as defined in the appended claims.

What is claimed is:

1. A teaching device for stringed instruments comprising:
   an elongate board having a surface with spaced opposite substantially parallel longitudinal edges;
   a pair of grooved rails extending substantially parallel to each other on the surface along the spaced opposite longitudinal edges of the board, the grooves being in spaced substantially parallel relation;
   a plurality of template cards adapted to be singularly inserted into said grooves of said rails;
   a plurality of transparent key templates to be singularly inserted into said grooves of said rails and disposed over said template card, each of said plurality of transparent key templates representing a specific musical key;
   indicating means disposed on said transparent key templates for indicating the proper notes to be played in the chosen musical key, said indicating means comprising circles strategically disposed on said transparent key templates, said circles encircling the proper notes to be played on said template card corresponding to the chosen musical key; and
   mounting means for removably mounting said board to a stringed instrument.

2. The teaching device of claim 1, wherein said plurality of template cards depict the string, note and fret configuration for a plurality of stringed instruments.

3. The teaching device of claim 1, wherein said mounting means comprises a plurality of brackets, said brackets being affixed to said elongate board and extending substantially perpendicularly from a longitudinal edge of said board.

4. The teaching device of claim 3, wherein said brackets have curved ends for formingly engaging a stringed instrument, said curved ends for removably fastening said teaching device to a stringed instrument.

5. The teaching device of claim 4, wherein said means for removably fastening said teaching device to the stringed instrument comprises a hook and loop type fastener.

6. The teaching device of claim 4, wherein said means for removably fastening said teaching device to the stringed instrument comprises a pressure clamp.

* * * * *